(12) United States Patent
Sawin et al.

(10) Patent No.: US 7,057,786 B2
(45) Date of Patent: Jun. 6, 2006

(54) ELECTRO-OPTIC ARRAY INTERFACE

(75) Inventors: Ray Sawin, Collinsville, CT (US); Salvador M. Fernández, Hartford, CT (US)

(73) Assignee: Ciencia, Inc., East Hartford, CT (US)

( * ) Notice: Subject to any disclaimer, the term of this patent is extended or adjusted under 35 U.S.C. 154(b) by 0 days.

(21) Appl. No.: 10/842,366

(22) Filed: May 10, 2004

(65) Prior Publication Data

US 2005/0248829 A1    Nov. 10, 2005

(51) Int. Cl.
*G02F 1/03*      (2006.01)
*G02F 1/00*      (2006.01)
*G02B 5/18*      (2006.01)
*G02B 26/00*     (2006.01)
*G09G 3/36*      (2006.01)

(52) U.S. Cl. .............. 359/245; 359/321; 359/558; 359/559; 359/295; 359/299; 345/87; 356/445

(58) Field of Classification Search ............. 359/321, 359/558, 559, 566, 245, 259, 318, 290, 291, 359/298, 295, 299, 320, 279; 356/445; 345/87, 345/92; 385/4, 10, 16
See application file for complete search history.

(56) References Cited

U.S. PATENT DOCUMENTS

| | | | | |
|---|---|---|---|---|
| 5,078,479 A | * | 1/1992 | Vuilleumier | 359/290 |
| 5,212,583 A | * | 5/1993 | Vali et al. | 359/245 |
| 5,835,458 A | * | 11/1998 | Bischel et al. | 369/44.12 |
| 5,911,018 A | * | 6/1999 | Bischel et al. | 385/16 |
| 5,978,524 A | * | 11/1999 | Bischel et al. | 385/4 |
| 6,034,807 A | * | 3/2000 | Little et al. | 359/227 |
| 6,411,272 B1 | * | 6/2002 | Edwards | 345/87 |
| 6,529,277 B1 | * | 3/2003 | Weitekamp | 356/445 |
| 6,654,156 B1 | * | 11/2003 | Crossland et al. | 359/290 |
| 6,768,666 B1 | * | 7/2004 | Tsu | 365/113 |
| 6,813,063 B1 | * | 11/2004 | Ishihara | 359/320 |
| 6,888,515 B1 | * | 5/2005 | Bekey | 343/912 |
| 2004/0046963 A1 | * | 3/2004 | Lackritz et al. | 356/445 |

* cited by examiner

Primary Examiner—Loha Ben
(74) Attorney, Agent, or Firm—Alix, Yale & Ristas, LLP

(57) ABSTRACT

A grating coupled surface plasmon resonance optical modulator is disclosed. A electro-optic polymer dielectric is deposited on the metallic surface of a diffraction grating to provide a metal/dielectric interface. A surface plasmon will propagate at the metal/dielectric interface in a resonant condition, e.g., when the metal surface is illuminated by transverse magnetic (TM) polarized light of the appropriate wavelength, angle of incidence and phase velocity. In the present invention, phase velocity is controlled by the diffraction grating. A transparent electrode deposited on the electro-optic layer allows an electrical potential to be applied across the electro-optic polymer. The applied electrical potential (voltage) changes the index of refraction of the electro-optic polymer, thereby disrupting the resonant condition to produce an optically detectable change in reflectance of incident light from the metal layer. The disclosed grating coupled surface plasmon resonance optical modulator may be configured as an electronically or optically addressable array.

21 Claims, 2 Drawing Sheets

ELECTRO-OPTIC ARRAY INTERFACE

The proposed invention relates generally to the field of spatial light modulators and optical interconnects. The invention is an optically addressable, dynamically reconfigurable, bi-directional, high-density, optical interconnect microarray based on the phenomenon of grating-coupled surface plasmon resonance (GCSPR). The device addresses the need for dense, fast, low power dissipation interconnect technology created by highly parallel, next generation computational systems. It will be able to provide connections between chips within a given module or between chips located on different modules with interconnection densities (number of microarray elements, N, per unit area) of the order of tens of thousands per cm$^2$ while reaching modulation or switch rates of the order of tens of GHz.

BACKGROUND OF THE INVENTION

At present, microprocessors are providing on-chip clock frequencies on the order of 1 GHz. The International Technology Roadmap for Semiconductors (ITRS) forecasts on-chip clock rates of about 10 GHz in 2011. Performance in the GHz range can only be fully exploited if the off-chip interconnection technology provides appropriate bandwidth, a constraint that will become increasingly more severe during the next ten years. This means that the challenge of routing signals off-chip and into the system in the GHz frequency range is expected to exceed that of achieving on-chip performance at these frequencies. In addition, highly parallel, next-generation computational systems will require highly dense connection networks containing many long-distance connections. In such highly connected, highly parallel systems, the module-to-module and long distance chip-to-chip connections are responsible for the majority of the power dissipation, time delay and surface area. Thus, it has become critically important to minimize the area, power and time delay of the chip-to-chip and module-to-module interconnects while, at the same time, increasing density and bandwidth. The Semiconductor Industry Association (SIA) has recognized these challenges and identifies interconnects as the primary chip-related technology with the largest potential technology gaps.

By replacing electrical intramodule and module-to-module connections with optical communication links, the communication bottleneck can be relieved. In recent years considerable R&D effort has been devoted to developing optical chip-to-chip interconnects to reduce this microelectronics interconnection problem. It has now been demonstrated that optical interconnects have the potential to increase communication speed and reduce the volume, crosstalk and power dissipation of the connections.

Despite recent progress and the demonstrated potential of optical interconnects this technology is still at an early stage and practical realization of its potential will require more efficient approaches and further improvements in performance. In particular, there is a need for reconfigurable interconnect technologies capable of higher density of connections while reducing power, area and cost.

Modern electronic circuits consist of semiconductor chips mounted on circuit boards. These boards are in turn assembled into modules and eventually into cabinets or chassis. There are:

| | |
|---|---|
| Very short interconnections | on the chip |
| Short interconnections | chip to chip |
| Medium interconnections | board to board |
| Long interconnections | module or chassis level |

These interconnections are formed electrically with metallic (usually aluminum or copper) pathways (traces). The density and total number of these interconnections has become a major challenge due to physical space requirements and to interfering cross talk.

It is clear, that an optical processing format could help significantly with these interconnections, but such help can not be applied until appropriate electro optic interfaces are available. Relatively simple optical connections are being implemented via waveguides in boards or free space links. These are limited in the number of practical connections that can be implemented. Sophisticated, all optical, arrays are being developed, which in general require several cubic mm of space and multiple light sources. Only the larger and most sophisticated can be reconfigurable.

Optical information processing can perform a multitude of operations because of its complex amplitude processing capability using several dimensions. There are two approaches to such processing, which have been pursued.
1. Approach #1 uses the Fourier-domain.
2. Approach #2 uses the Spatial-domain.

Both approaches have trade-offs, and difficulties with signal to noise, which have brought forward many versions of distortion invariant matched filters. It has been demonstrated though that optics can offer advantages of optical parallelism, high resolution, and massive connectivity.

However, the prevalent electronic digital computing offers much greater flexibility for various implementations, and will not soon give way to an all-optical approach. An electro-optic interface, which would allow a hybrid electronic-digital/optical approach, could solve two problems with emerging processors.

Problem 1.

As integrated circuits (and modules) have grown in complexity and size, the number of in-out interconnections has become almost impossible to implement. The fundamental problem is that there is simply no surface area available for more electrical conductors. An optical interconnection scheme could help immeasurably because no conductive traces are required, fewer connections are required (does not require signal plus ground) and additional dimensions can be utilized. There is no longer a need to remain planar.

Problem 2.

As increasingly dense systems of higher speeds are created, there is a need for parallel processing, which requires "long distance" interconnects. There is an adverse effect on power, speed, and heat. Although desirable for some emerging systems, it is extremely difficult to make the parallelism dynamically reconfigurable, and crosstalk can be a problem, especially if any analog signals are present. An optical interconnection scheme could help significantly because it removes the requirement for long traces, can be reconfigurable, allows high speed, results in less power density, and minimizes cross talk.

An electro-optical interconnection requires that some form of modulation be implemented whereby either the electrical signal modulates an optical signal, or the optical signal modulates the electrical signal, or both. This is likely to be of the Spatial-domain type since most Fourier type are optical to optical. Spatial modulators have been made using special crystals (for example Lithium Niobate, Barium Titanate), liquid crystals, and various polymers. Special crystals are prohibitively expensive and cumbersome to work with, but can be fast (GHz). Liquid crystals are slow. Polymers are attractive because they offer low cost, ease of fabrication, and high speed. Polymer development work is ongoing at University type laboratories, and some telecommunication companies. To date, these materials suffer from drive level and lifetime problems. These problems could be alleviated, if a separate enhancement to the modulation mechanism within the polymer were provided. Required characteristics of the polymer would be made less stringent.

SUMMARY OF THE INVENTION

It is the object of this invention to provide a means for combining optical signal processing with electronic digital processing by implementing an ELECTRO-OPTIC ARRAY INTERFACE using grating coupled SPR with an electro-optic polymer coating. The array may be reconfigurable by optically addressing photo cell type junctions. There are five primary elements to the invention:
1. An area illumination of a wavelength suitable for a grating coupling to an evanescent wave when arriving at a suitable angle of incidence.
2. A grating with an appropriate conductive film and polymer dielectric to create a surface plasmon resonance. Grating spacing is compatible with 1, above.
3. A pattern of stripes at oblique relationship of electrically conductive films forming top and bottom electrodes. The dimensions of the film stripes is compatible with intended speed and array density. Thickness is governed by SPR considerations on the bottom, and efficiency on the top. The top is optically transparent as in indium tin oxide (ITO) or similar, including non metals or oxides.
4. A pattern of photo cells arranged within the electrodes.
5. Light source or sources to address the photo cells.

The photo cells may be omitted.

The invention is an optically addressable dynamically reconfigurable, bi-directional, high-density, optical interconnect microarray based on the phenomenon of grating-coupled surface plasmon resonance (GCSPR). The optical interconnect device comprises four components: an illumination source to provide a read beam, a spatially modulatable (optically) planar reflector microarray, a detector array and a second light source (array) to provide a write beam. The reflector microarray contains N discrete elements that are optically addressable in parallel and whose reflecting properties are thus modulated to change the intensity of an incident optical beam. The SPR microarray divides the incident light into N beams (to provide a fanout factor of N), and directs each beam onto the appropriate element of the detector array. With this device optical connections may be made between chips within a given module or between chips located on different modules. The ultimate interconnection density (number of microarray elements, N, per unit area) that can be achieved in practice remains to be established; however, we estimate that densities of the order of 10,000 per $cm^2$ should be feasible and values up to 100,000 may be possible. In addition to this high interconnect density, the proposed technology could, in principle, reach modulation or switch rates of the order of tens of GHz.

Since the phenomenon of surface plasmon resonance (SPR) provides the basis for the proposed optically addressable interconnect microarray, for convenience we refer to the proposed device and the associated technology by the shorthand acronym of SPROM (Surface Plasmon Resonance Optically addressable Microarray).

DETAILED DESCRIPTION OF THE PREFERRED EMBODIMENT 1.2.1 Surface Plasmon Resonance At the heart of the SPROM is the high-density, dynamically reconfigurable reflector microarray. Since its function is based on grating-coupled SPR, understanding its operation and fabrication require some knowledge of the physics of SPR, which we briefly review in this section.

The theory of surface plasmon resonance is well established. When a metal surface is illuminated by TM-polarized light of the appropriate wavelength and angle of incidence, a resonance condition occurs and energy from the light is coupled into the electrons of the metal to excite what is called a surface plasmon. A surface plasmon is a propagating electron oscillation in a metal at a metal/dielectric interface. The associated electromagnetic fields constitute a guided surface mode of the conductor-dielectric interface and are evanescent in each medium with intensity decaying exponentially away from the surface. Penetration into the dielectric depends on the wavelength of the incident light and is typically of the order of a few hundred nm. When the conductor is a high-conductivity metal such as silver or gold and with air as the dielectric, the enhancement of the field intensity at the plasmon interface over that of the incident beam is about two orders of magnitude, and a large fraction of the plasmon field energy lies in the dielectric, where it is available for sensing or modulation purposes.

Figure 1:
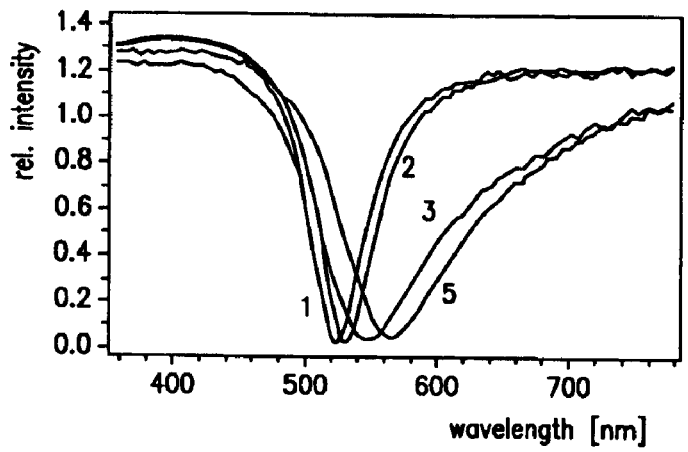
FIG. 1 illustrates SPR curves from a prior art biosensor illuminated with collimated broadband light indicating the wavelength corresponding to the reflectance minimum.

The resonance condition (at which incident light couples into the surface plasmon) is manifested by a large fall in reflectance of the incident beam, the energy of which is transferred to the surface plasmon. The SPR resonance condition depends on the wavelength of the incident light, the angle of incidence and the index of refraction at the metal/dielectric interface. Because of these parametric dependences, SPR can be exploited to design sensors to measure changes in index of refraction of the dielectric layer next to the metal surface or spatial light modulators can be implemented by using an active EO material as the dielectric medium. Sensors typically operate by illuminating the metal surface with monochromatic light and determining the incident angle at which the reflectance is at a minimum or by illuminating with collimated broadband light and determining the wavelength at which the reflectance minimum occurs. Examples of SPR curves obtained from a biosensor using the latter approach are shown in FIG. 1. Curves labeled 1 through 5 represent increasing amounts of protein bound to the biosensing surface.

Using these principles, SPR sensors have been developed that can routinely measure refractive index changes of ~$1\times10^{-6}$. One of the most important applications of SPR that has emerged in the last decade is biosensing. In SPR biosensors the metal surface is coated with capture molecules (e.g. antibodies) to bind specific biomolecules (e.g. proteins). Protein binding to the surface causes a change in index of refraction. Using SPR biosensors, protein binding detection limits of the order of 1 pg/mm$^2$ have been achieved.

1.2.3 Grating-Coupled Surface Plasmon Resonance

Figure 2:
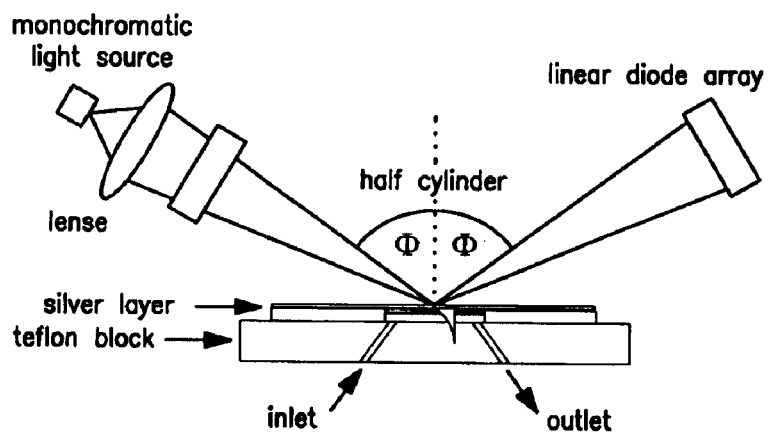
FIG. 2 illustrates a prior art prism coupled, or Kretschmann configuration.

A key point to understand is that surface plasmons cannot be directly excited by illuminating an isolated planar metal, surface. The reason is that the phase velocity of the surface plasmon is slower than that of light and therefore their wave vectors cannot be matched to achieve resonance. This problem is typically circumvented by using the so-called prism-coupled technique or Kretschmann configuration. In this method, a gold film that has been vapor-deposited onto a high-index glass microscope slide is brought into optical contact with a high-index glass prism using a thin layer of index matching fluid. Illumination of the gold layer is performed through the prism at an angle greater than the critical angle for total internal reflection. The high index of refraction of the prism reduces the phase velocity of light. Under these conditions the surface plasmon can be excited by the evanescent light wave at the prism/metal interface. FIG. 2 shows a typical Kretschmann configuration sensor with angle interrogation of the SPR curve.

Figure 3:
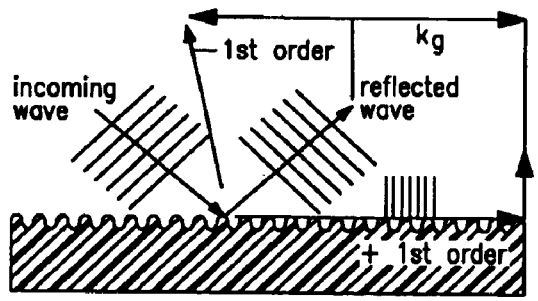
FIG. 3 illustrates a grating coupled surface plasmon configuration.

An elegant alternative to the Kretschmann configuration is grating-coupling. This is implemented by coating a diffraction grating with a thin film of a high-conductivity metal (e.g., silver or gold). A diffraction grating is a periodically modulated interface between two media of different optical properties. A light wave incident on a grating is diffracted into various orders. With proper selection of the angle of incidence, wavelength of the incident light and grating periodicity, a higher diffracted order can be made to have a wave vector component along the grating plane that matches that of the surface plasmon, as illustrated in FIG. 3. Grating-coupling permits direct illumination of the metal surface and obviates the need for the cumbersome prism and index matching fluids.

Until now, most SPR systems have been based on the Kretschmann configuration. Light modulation by prism-coupled SPR has been used for the study of voltage-dependent alignment in liquid crystals and a prism-coupled surface plasmon spatial light modulator based on a liquid crystal has been reported. The lack of grating-coupled systems has been due to the greater complexity of fabrication that was previously required to make gratings. However, recent technological advances have reversed this situation. Plastic optical gratings can now be mass produced at very low cost using the same technology that is used to produce DVDs (digital video disks) or CDs and could be formed in spin cast layers. Recently, the P.I. developed a microarray-based grating-coupled SPR biosensor system for proteomics applications. This system is capable of massively-parallel detection of hundreds to thousands of protein binding events and of monitoring binding kinetics in real time.

Grating coupling has significant advantages for optical interconnect applications in terms of size, cost and configuration flexibility. In addition, it allows smaller angles of incidence and hence increased aperture, provides greater spatial uniformity and permits higher refractive index EO materials to be used. In addition, it enables easy integration with circuit boards, modules and integrated circuits.

1.2.4 The Optically Addressable SPR Interconnect Microarray

Figure 4:
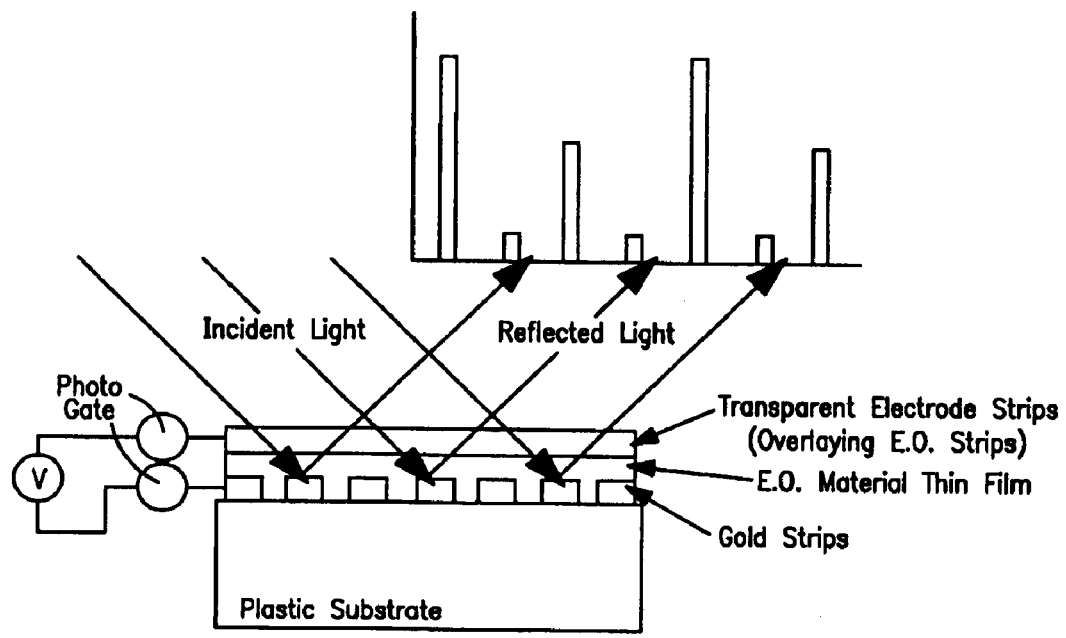
FIGS. 4 and 5 are side and top views, respectively, of an optically addressable grating coupled surface plasmon resonance array according to aspects of the present invention.

With the above discussion as background it is now possible to describe the proposed innovation in greater detail. A schematic of the SPROM modulator illustrating the principle of operation is shown in FIG. 4.

Figure 5:
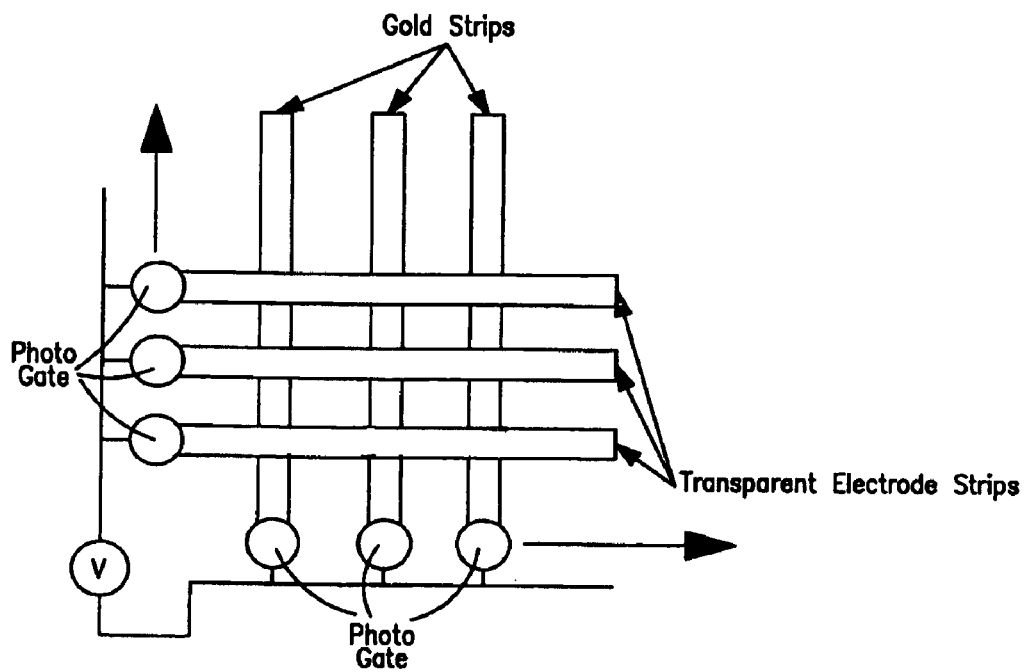

The device consists of a plastic grating onto which a gold electrode array consisting of strips along the X-direction (parallel to the grating grooves) is deposited. The width of the gold electrodes should be of the order of the plasmon propagation length (~20 µm). Above this gold array is deposited a thin film of the EO material that forms the dielectric, and which should be greater than 0.2 µm thick to fully support the plasmon field. A second transparent electrode array (e.g. conducting polymer or ITO) consisting of strips in the Y-direction at right angles to the gold electrodes is applied over the EO dielectric layer. With this architecture the EO film is made locally addressable by applying a potential difference between any X-Y electrode pair. Induced changes in the dielectric constant at each pixel locally shift the plasmon resonance condition thereby shifting or otherwise distorting the reflectivity curve. If the device is illuminated with an expanded collimated, TM-polarized read beam at an angle near resonance, spatial light modulation will be obtained directly after reflection. In order to enable the device to be optically addressable, the transparent and the gold electrodes are connected to the voltage source through photoconducting gates made from a photoconducting material, such as amorphous silicon. Addressing is accomplished by Illuminating the appropriate photoconducting gates with the write beam. A conceptual diagram of the electrode configuration to accomplish the optical addressing is shown in FIG. 5. Chips containing laser diode arrays would provide the write beams for optical addressing of the modulator array.

For purposes of creating an electro-optic array interface, an EO polymer will be used in conjunction with grating coupled SPR.

The array may vary from 1 or a few nodes to 10,000 or more.

The interface is bi-directional.

For purposes of creating electrical addressable nodes within the array, electrically conductive stripe type electrodes will be located obliquely above and below the polymer. The crossing of a top stripe and a bottom stripe define a node. Each node offers an interconnect path, which can be switched from on to off, or in-between by applying a correct voltage to the electrodes of the node. Many or few nodes may be selected simultaneously.

For purposes of creating optically addressable nodes within the array, photo cells are created in each electrode stripe. A separate light source or sources may turn on (or off) a stripe by lighting a photo cell. The pattern of activation may be reconfigured at any time.

The SPR situation is an enhancement to the modulation mechanism of the polymer, and promotes speed, long life, and reduces cost of polymer by easing performance requirements.

The proposed interconnect scheme offers a speed, density, parallelism combination not attainable by all electronic means.

The proposed electro-optic interconnect scheme is compatible with semiconductor wafer fabrication practices. This is due to the grating coupling being planar, the electrodes being photolithographically defined, the photo cells being deposited as films, and the light sources being compatible as LED's or similar.

The proposed electro-optic interconnect scheme is compatible with multiple connected wafers or modules in multi-dimensional form.

1.3 Features, Advantages and Benefits of the Innovation

The proposed optical interconnect technology based on grating-coupled SPR has a number of significant and compelling advantages over other structures that have been previously considered:

High interconnect density and bandwidth. Electro-optic effects tend to be weak in high-speed devices while large effects are obtainable only in slower materials. One way to enhance the degree of light modulation that is obtainable from a given EO effect is to use the active material in a resonantly excited guided mode. The field intensity in the guide can then be much higher than that of the incident beam, and if the mode propagates in some active material, the modulation of the incident beam can be enhanced accordingly. Unfortunately, the degree of enhancement increases with decreasing mode loss; i.e., increasing mode propagation length, and thus, a sensitivity-spatial resolution trade-off occurs. Guided waves are most commonly encountered in low-loss dielectric materials and have propagation lengths of the order of several millimeters or more. SPR, however, propagates on the surface of a metal, which is a relatively lossy medium and thus has a short propagation length (~20 μm). This is sufficiently short to allow two-dimensional spatial light modulation to be obtained at high resolution (>10 lp/mm). In terms of an optical interconnect device these characteristics of SPR allow the use of fast EO materials thereby enabling high bandwidth while maintaining high spatial resolution of the order of tens of thousands of pixels per $cm^2$. This will be important for next generation processor arrays that will consist of hundreds of chips containing up to 512 processing elements per chip. Since efficient connection networks for many algorithms require at least one long-distance connection per processing mode, a multichip system capable of providing ~512 connections per chip is desired. For a module containing 64 chips, this amounts to over 32,000 high-speed intramodule connections.

Uniformity. In conventional spatial light modulators the beam must be transmitted through several interfaces and it often encounters a multilayer reflector and also an output polarizer. In prism-coupled SPR devices the beam encounters all three faces of the coupling prism. In contrast, in the proposed grating-coupled SPR optical interconnect device, light modulation is achieved directly by the interaction of the light beam with a thin film on a single interface. This will result in better response uniformity. Another attractive feature of SPROM is that light modulation occurs within a thin (~0.2 μm) evanescent field region that is supported by and bound to the metal surface. The response is therefore relatively immune to any thickness variations in the EO layer, which is another source of nonuniformity.

Dynamically reconfigurable. The pattern of optical interconnects is not fixed for a given device but is electronically or optically addressable (depending on implementation design) and dynamically reconfigurable.

Bidirectional operation. Although FIG. 1 illustrates a one-way optical interconnect, the SPROM device can be potentially implemented as a bi-directional interconnect. This could be achieved by adding a second light source and detector pair oriented in the opposite direction. A number of configurations are possible: In one case, the incident angle of illumination could be slightly offset for each light source/detector pair such that each pair monitored reflectance changes on opposite sides of the reflectance resonance curve. This implies that if a given pixel is at resonance for one direction it would be off resonance in the other direction. Alternatively, the wavelength of one light source could be shifted relative to the other to compensate for their different angle of incidence such that a given pixel would be on or off simultaneously for both directions. A third possibility would be to use beam splitters so that both beams used the same wavelength and angle of incidence.

Optically Addressable. This will enable fast, free-space long distance intermodule connections with low power dissipation.

Versatility. SPROM can be configured in a variety of potentially useful forms. In one configuration of interest the incident light beam many contain temporal information that is to be transmitted at different times to various receivers. An electronic control signal would determine which receivers,of many (limited by the number of elements in the SPR array) would receive the information-carrying signal in a time-multiplexed format. In another configuration the incident light beam may have no information impressed upon it, but it will be spatially modulated via the electronic control signal to selectively transmit the signal to a set of receivers. The reflectance modulation of each microarray element could be binary (on/off) or it could be a graded response to enable more complex modulation.

Robustness. SPROM avoids the dispersion, emission of and susceptibility to electromagnetic radiation problems of conventional electrical interconnects, and also is not subject to the attenuation problems of plastic optical fibers and speed limitation of high refractive index glasses. Also alignment issues are less critical due to the relatively broad width (~0.2 degrees) of the SPR reflectance resonance curve. Another important feature is the high angle of incidence possible with grating coupling. This avoids some of the problems encountered in prism-coupled systems, which require illumination at an oblique angle, such as low aperture and image distortion.

In this invention, illumination entirely covers an array consisting of obliquely crossing top and bottom conducting electrodes separated by an electro-optic polymer deposited on a grating. The grating is designed to couple the illumination into evanescent mode wave energy in the under electrode. The angle of illumination, the nominal thickness and type of electrode, the nominal index of refraction of the polymer, and the grating comprise an SPR situation. That is, a surface plasmon resonance situation is created whereby each crossing of the electrodes makes a node which is addressed electrically by selection of a bottom electrode and top electrode or electrodes. A proper voltage applied to these electrodes will allow the resonance to be destroyed or modulated so as to control the on or off state of light energy leaving each node. Furthermore, photo cells are incorporated in each electrode so that electrodes may be addressed optically as well. The illumination is compatible with the grating. The optically addressing light is compatible with the photo cells, which change their electrical resistance in response to light. A connection path is completed by having appropriate photoreceptive circuitry receive the light ray emanating (or not emanating) from each node.

It is a specific point of this invention that the above can be made compatible with semiconductor wafer processing procedures. For instance, the grating may be formed in the semiconductor wafer, or formed in a polymer coating on the wafer. The illumination can be from an LED or similar on the wafer with a suitable super structure such as a mirror. The photo cells may be deposited on the wafer. In this manner, drive circuitry for the electrodes would be designed in the wafer layout. Several layers of wafers may be involved to achieve a multi dimensional structure.

It is a specific point of this invention that the SPR situation enhances the modulation effect of the polymer by a factor of many tenfold (say 10 E4 or 10E5). This specifically allows the polymer to undergo some relaxation and still function, providing a long life. This also aids in switching speeds.

It is a specific point of this invention that the array interface may couple over great distances, allowing modules to be interconnected in complicated structures. Such a connecting approach will not be as sensitive to alignment as holographic diffraction schemes.

What is claimed:

1. An optical modulator comprising:
   a metal layer deposited on a grating, said grating configured to couple incident light with surface plasmon in the metal layer in a resonant condition;
   an electro-optic polymer layer deposited on the metal layer, said electro-optic polymer layer having an index of refraction responsive to changes in an electrical potential applied to said electro-optic polymer layer; and
   a transparent electrode deposited on the electro-optic polymer layer; and
   wherein said resonant condition is modulated by application of an electrical potential between said metal layer and said transparent electrode to alter said index of refraction.

2. The optical modulator of claim 1, wherein said incident light has a wavelength and an angle of incidence relative to said metal layer, said surface plasmon has a phase velocity and said grating has a periodicity,
   wherein said incident light is diffracted into various orders by said grating and said periodicity is selected so that at least one of said orders has a phase velocity that matches the phase velocity of said surface plasmon.

3. The optical modulator of claim 1, wherein said grating is a diffraction grating comprising a periodically modulated interface between two media of different optical properties.

4. The optical modulator of claim 1, wherein said grating is a periodically modulated surface of a plastic substrate.

5. The optical modulator of claim 1, wherein said metal layer is silver, gold or a combination of silver and gold.

6. The optical modulator of claim 1, comprising a light responsive switch arranged to apply an electrical potential to at least one of said metal layer or said transparent electrode.

7. An optical interconnection comprising:
   a light source generating incident light;
   a metal layer deposited on a grating, said grating configured to couple said incident light with surface plasmon in the metal layer in a resonant condition;
   an electro-optic polymer layer deposited on the metal layer, said electro-optic polymer layer having an index of refraction responsive to changes in an electrical potential applied to said electro-optic polymer layer; and
   a transparent electrode deposited on the electro-optic polymer layer; and
   a detector arranged to detect incident light reflected from said metal layer, the reflectance of said metal layer being reduced in said resonant condition,
   wherein said resonant condition is modulated by application of an electrical potential between said metal layer and said transparent electrode to alter said index of refraction.

8. The optical interconnection of claim 7, wherein said incident light has a wavelength and an angle of incidence relative to said metal layer, said surface plasmon has a phase velocity and said grating has a periodicity,
   wherein said incident light is diffracted into various orders by said grating and said periodicity is selected so that at least one of said orders has a phase velocity that matches the phase velocity of said surface plasmon.

9. The optical interconnection of claim 7, wherein said grating is a diffraction grating comprising a periodically modulated interface between two media of different optical properties.

10. The optical interconnection of claim 7, wherein said grating is a periodically modulated surface of a plastic substrate.

11. The optical interconnection of claim 7, wherein said metal layer is silver, gold or silver and gold.

12. The optical interconnection of claim 7, comprising a light responsive switch arranged to apply an electrical potential to at least one of said metal layer or said transparent electrode.

13. An addressable optical modulator array comprising:
   a grating;
   a plurality of substantially parallel metal electrodes having a longitudinal dimension, said metal electrodes deposited on said grating with said longitudinal dimension extending along an X direction, said grating configured to couple incident light with surface plasmons in said metal electrodes in a resonant condition;
   an electro-optic polymer layer deposited over said metal electrodes, said electro-optic polymer layer having an electrically sensitive index of refraction;
   a plurality of substantially parallel transparent electrodes having a longitudinal dimension, said transparent electrodes deposited on said electro-optic polymer layer with said longitudinal dimension extending along a Y direction to intersect with said metal electrodes, each intersection defining an optical node which can be modulated by applying an electrical potential between a metal electrode and a transparent electrode defining the intersection; and
   wherein each said optical node is addressable by application of an electrical potential between a selected metal electrode and a selected transparent electrode to alter said index of refraction and thereby modulate said resonant condition.

14. The addressable optical modulator array of claim 1, wherein said incident light has a wavelength and an angle of incidence relative to said metal electrodes, said surface plasmons have a phase velocity and said grating has a periodicity,
   wherein said incident light is diffracted into various orders by said grating and said periodicity is selected so that at least one of said orders has a phase velocity that matches the phase velocity of said surface plasmons.

15. The addressable optical modulator array of claim 1, wherein said X direction is perpendicular to said Y direction.

16. The addressable optical modulator array of claim 1, wherein said grating is a diffraction grating comprising a periodically modulated interface of a plastic substrate.

17. The addressable optical modulator array of claim 1, wherein said metal electrodes are silver or gold or a combination of silver and gold.

18. The addressable optical modulator array of claim 1, comprising a light responsive switch arranged to apply an electrical potential to each said metal electrode and each said transparent electrode.

19. The addressable optical modulator array of claim 1, wherein said metal electrodes have a width transverse to said longitudinal dimension, said width being approximately 20 μm.

20. The addressable optical modulator array of claim 1, wherein said incident light is TM-polarized light.

21. The addressable optical modulator array of claim 1, wherein said metal electrodes and said transparent electrodes are connected to an electrical potential by photoconducting gates.

* * * * *

UNITED STATES PATENT AND TRADEMARK OFFICE
CERTIFICATE OF CORRECTION

| | |
|---|---|
| PATENT NO. | : 7,057,786 B2 |
| APPLICATION NO. | : 10/842366 |
| DATED | : June 6, 2006 |
| INVENTOR(S) | : Sawin et al. |

Page 1 of 1

It is certified that error appears in the above-identified patent and that said Letters Patent is hereby corrected as shown below:

Column 10:

Line 59, delete "claim 1," and substitute --claim 13,--.

Column 11:

Line 1, delete "claim 1," and substitute --claim 13,--.

Line 3, delete "claim 1," and substitute --claim 13,--.

Line 6, delete "claim 1," and substitute --claim 13,--.

Line 9, delete "claim 1," and substitute --claim 13,--.

Column 12:

Line 1, delete "claim 1," and substitute --claim 13,--.

Line 5, delete "claim 1," and substitute --claim 13,--.

Line 7, delete "claim 1," and substitute --claim 13,--.

Signed and Sealed this

Twenty-seventh Day of February, 2007

JON W. DUDAS
*Director of the United States Patent and Trademark Office*